US010293313B2

(12) United States Patent
Wallgren

(10) Patent No.: US 10,293,313 B2
(45) Date of Patent: May 21, 2019

(54) LUMP CONDITIONER FOR A MIXER

(71) Applicant: Mark Wallgren, King (CA)

(72) Inventor: Mark Wallgren, King (CA)

( * ) Notice: Subject to any disclaimer, the term of this patent is extended or adjusted under 35 U.S.C. 154(b) by 642 days.

(21) Appl. No.: 14/735,768

(22) Filed: Jun. 10, 2015

(65) Prior Publication Data

US 2016/0016131 A1 Jan. 21, 2016

Related U.S. Application Data

(60) Provisional application No. 62/010,145, filed on Jun. 10, 2014.

(51) Int. Cl.

| | |
|---|---|
| ***B01F 7/00*** | (2006.01) |
| ***B28C 5/12*** | (2006.01) |
| ***B01F 7/02*** | (2006.01) |
| ***B28C 5/00*** | (2006.01) |
| ***B29B 7/00*** | (2006.01) |
| ***B01F 7/04*** | (2006.01) |

(52) U.S. Cl.

CPC ...... *B01F 7/00283* (2013.01); *B01F 7/00116* (2013.01); *B01F 7/00133* (2013.01); *B01F 7/00158* (2013.01); *B01F 7/00641* (2013.01); *B01F 7/02* (2013.01); *B01F 7/04* (2013.01); *B28C 5/006* (2013.01); *B28C 5/12* (2013.01); *B29B 7/002* (2013.01); *B01F 2215/0047* (2013.01)

(58) Field of Classification Search

CPC .............. B01F 7/00283; B01F 7/00133; B01F 7/00158; B01F 7/00116; B01F 7/00641; B01F 7/02; B01F 7/04; B01F 2215/0047; B28C 5/006; B28C 5/12; B29B 7/002

See application file for complete search history.

(56) References Cited

U.S. PATENT DOCUMENTS 3,917,235 A 11/1975 Deve
4,278,355 A * 7/1981 Forberg .................. B01F 7/042 366/300

(Continued)

FOREIGN PATENT DOCUMENTS

CA 1124709 6/1982
DE 2705077 8/1978

(Continued)

*Primary Examiner* — Anshu Bhatia

(74) *Attorney, Agent, or Firm* — Ryan W. Dupuis; Ade & Company Inc.; Kyle R. Satterthwaite

(57) ABSTRACT

A mixer having i) a vessel defining a mixing chamber surrounded by boundary walls for receiving a mixture containing lumps therein, ii) a plurality of mixing blades, and iii) a driving mechanism supporting the mixing blades in the mixing chamber for mixing motion relative to the vessel so as to mix the mixture within the mixing chamber of the vessel, further includes at least one lump conditioning blade. The lump conditioning blade is supported by the driving mechanism such that the lump conditioning blade is movable in a working direction along a respective one of the boundary walls with a working edge of the blade being maintained at a prescribed space from the boundary wall which is effective to reduce a lump size of the lumps in the mixture as the mixture passes between the working edge of the lump conditioning blade and the boundary wall.

12 Claims, 3 Drawing Sheets

(56) References Cited

U.S. PATENT DOCUMENTS

| | | | | |
|---|---|---|---|---|
| 5,535,665 | A | 7/1996 | Wong | |
| 5,615,951 | A | 4/1997 | Gabriele | |
| 6,923,393 | B1 * | 8/2005 | Neier | B01F 7/00008 241/260.1 |
| 2005/0132782 | A1 | 6/2005 | Wallevik | |
| 2012/0024996 | A1 * | 2/2012 | Bongratz | B01F 7/00133 241/101.5 |
| 2013/0206879 | A1 | 8/2013 | Cadorin | |

FOREIGN PATENT DOCUMENTS

| | | |
|---|---|---|
| DE | 3037333 | 5/1982 |
| FR | 2782937 | 3/2000 |
| GB | 718893 | 11/1954 |
| GB | 2249269 | 5/1992 |
| WO | 03073860 | 9/2003 |
| WO | 2014021180 | 2/2014 |

* cited by examiner

LUMP CONDITIONER FOR A MIXER

This application claims the benefit under 35 U.S.C.119(e) of U.S. provisional application Ser. No. 62/010,145, filed Jun. 10, 2014.

FIELD OF THE INVENTION

The present invention relates to a mixer, for example a mixer used to uniformly mix and condition a paste, in which a lump conditioning blade is provided for movement along a respective boundary wall of a mixing chamber of the mixer, and more particularly the present invention relates to supporting the lump conditioning blade at a controlled space relative to the boundary wall, whereby lumps in the paste within the mixer is reduced as the lumps are forced to pass between a working edge of the lump conditioning blade and the boundary wall.

BACKGROUND

In various industries, mixers are used to uniformly mix various particulate materials. In many industries, for example mining, power generation, and oil sands, tailings are mixed with water to produce a material of consistent water content—a conditioned tailings to be used for further processing. In the mining industry, tailings result from the refinement of ore. These tailings are sometimes mixed together with water and cement to provide fill for underground mining methods. These tailings particles usually cover a spectrum of particle sizes ranging from clay size particles to sand sized particles (typically <1 μm to >1 mm). When using the tailings to produce minefill, it is sometimes desirable to dewater the tailings to generate a fill with sufficient strength and pumpability at an optimized cost. Controlling the moisture content of the tailings is necessary to produce a fill with predictable strength. The process of producing tailings at a consistent moisture content is often accomplished by filtering part of the tailings stream and recombining it with a controlled amount of water to reach a target moisture content. Filtration of many tailings materials generates cohesive 'lumps' of material. In the case of minefill the lumps in the material can create problems with pumping the fill through pipelines. As such, these cohesive lumps are introduced into a mixer for mixing and conditioning with water to reduce the size and amount of lumps. Current mixers on the markets, however, are only designed for mixing and are inefficient at breaking down the lumps in the material.

Various types of mixers which are known to be used for mixing various paste-like mixtures include horizontal single and twin shaft mixers, ribbon mixers, pan mixers, and planetary mixers. In a horizontal shaft mixer, conventional mixing blades are typically provided with a leading surface at an angle to the direction of motion, generally around 30 degrees off the normal plane of the motion vector. This pushes material to slide off the paddle and urges the material within the mixer not only in the circumferential direction of motion of the paddle, but also out of the plane of the motion of the paddles in an axial direction of the shaft. These motions of the material are required to effectively mix the material inside the mixer.

The leading surface of the paddles are close to normal or even with a positive angle to the tangential surface (ie the boundary wall) of the mixer, and the leading edge of the paddle is adjusted to be directly adjacent to the boundary wall to prevent coarse gravel from being crushed between the paddle and the surface of the mixer. The leading edge is also close to the boundary wall of the mixer because that will scrape any material off the wall to ensure that the mixer stays clean without buildup along the surfaces of the boundary walls of the mixing chamber of the mixer.

Although the arrangement of the mixing paddles described above have been found to be effective for mixing the paste, the known arrangement of paddles are ineffective at breaking up lumps or reducing lump size when mixing a paste-like mixture of moistened fine particles which has a tendency to clump.

SUMMARY OF THE INVENTION

The invention is a modification to existing mixers to make them suitable to condition lumps in the material being mixed.

According to one aspect of the invention there is provided an improvement in a mixer comprising i) a vessel defining a mixing chamber therein surrounded by boundary walls for receiving a mixture containing lumps therein, ii) a plurality of mixing blades, and iii) a driving mechanism supporting the mixing blades in the mixing chamber for mixing motion relative to the vessel so as to mix the mixture within the mixing chamber of the vessel, in which the improvement comprises: a) the mixing blades including at least one lump conditioning blade having a rigid body terminating at a working edge along an outer side of the rigid body; and b) the driving mechanism supporting said at least one lump conditioning blade such that the lump conditioning blade is movable in a working direction along a respective one of the boundary walls with the working edge at a prescribed space from the boundary wall which is effective to reduce a lump size of the lumps in the mixture as the mixture passes between the working edge of the lump conditioning blade and the boundary wall.

The lump conditioning blade effectively smears the lumps against the boundary walls of the mixing chamber of the mixer, to reduce the size of the lumps. The lump conditioning blade is particularly effective when used in combination with conventional mixing blades which subsequently scrape the smeared mixture off of the boundary walls subsequent to the lumps being broken up by the lump conditioning blade.

According to a second aspect of the present invention there is provided a method of reducing lump size in a mixture containing lumps, the method comprising:

providing a mixer as described above; and operating the driving mechanism to move said at least one lump conditioning blade in the working direction along the respective boundary wall with the working edge at said prescribed space from the boundary wall such that the mixture passes between the working edge of the lump conditioning blade and the boundary wall.

When the mixer is used to mix a mixture comprising aggregate particles having a maximum diameter, preferably the prescribed space is greater than the maximum diameter of the aggregate particles.

The mixer may be used to mix a mixture comprising a paste consisting of moistened tailing fines in a mining or oil sands operation, or alternatively to mix a mixture comprising concrete for example.

When the boundary walls of the vessel include a general cylindrical portion, preferably the driving mechanism comprises at least one horizontal shaft supporting the mixing blades thereon for rotation about a horizontal mixing axis.

When the boundary walls of the vessel include a pair of generally cylindrical portions, preferably the driving mechanism comprises a pair of horizontal shafts associated with the pair of cylindrical portions respectively upon which the mixing blades are supported for rotation relative to the boundary walls.

Preferably the working edge of said at least one lump conditioning blade is discontinuous along a length thereof, for example the working edge of said at least one lump conditioning blade may be serrated.

Preferably the mixing blades include at least one primary blade having a rigid blade body terminating at a working edge along an outer side of the rigid body which is supported by the driving mechanism so as to be movable in a working direction along a respective one of the boundary walls with the working edge thereof being in closer proximity to a respective one of the boundary walls than the working edge of said at least one lump conditioning blade. Preferably the working edge of said at least one primary blade is supported by the driving mechanism directly adjacent the boundary wall so as to be arranged to scrape the mixture from the boundary wall.

Preferably the working edge of said at least one primary blade is disposed at an angle relative to the working direction thereof which is greater than an angle of the working edge relative to the working direction of said at least one lump conditioning blade.

The leading face of the blade body of said at least one primary blade may be disposed at an angle relative to the working direction thereof which is greater than an angle of a main portion of a leading face of the blade body of said at least one lump conditioning blade.

The lump conditioning blade may be supported by the driving mechanism along the same boundary wall in a leading relationship ahead of said at least one primary blade in the working direction.

The working edge of said at least one lump conditioning blade is preferably oriented substantially parallel to the respective boundary wall and at an angle relative to the working direction between 60 and 90 degrees. More preferably, the working edge of said at least one lump conditioning blade may be oriented near perpendicular to the working direction.

When the blade body of said at least one lump conditioning blade includes a leading face having an outer end portion locating the working edge thereon and a main portion which inwardly disposed relative to the outer end portion, preferably the working edge is supported in a trailing relationship in the working direction relative to the main portion of the leading face of the blade body.

The main portion of the blade body of said at least one lump conditioning blade may be substantially perpendicular to the respective boundary wall.

The main portion of the blade body of said at least one lump conditioning blade may be disposed at an angle of approximately 60 to 90 degrees to the working direction. More particularly, the main portion of the blade body may be near perpendicular to the working direction.

In the illustrated embodiment the improvement includes the following features:

i) A blade which is pulled away from the wall introducing a much bigger gap between the edge of the blade and the mixer wall, as compared to conventional mixing blades, thus defining a 'smearing gap' through which the lumps are squeezed to reduce the lump size.

ii) The angle of the normal vector of the front surface to the velocity vector is changed as compared to conventional mixing blades, thus making it almost perpendicular (angle varies between 0 to 20 degrees) or perpendicular to turn it into a shearing blade instead of a mixing blade.

iii) The surface at the outer edge of the blade curves or is bent away from the normal to the tangent in a trailing relationship relative to the direction of motion, thus acting to trap the material between the edge of the mixer and smear it onto the mixing wall. The bend in the surface could be a curvature or simply two flat surfaces at an angle to each other to generate the same effect with a smearing angle to the surface which is perpendicular to the tangential surface. This will force the material to get smeared onto the wall or kneaded between the wall and the shearing blade.

iv) The outer working edge of the shearing blade is serrated, jagged, or otherwise interrupted and discontinuous to ensure that the agglomerated lumps are not smeared into a smooth surface, but rather the working edge introduces as much surface to the smeared mixture for the water to penetrate it as much as possible.

v) These blades are put in together with the customary paddles on the same arcs such that the shearing blade smears any agglomerated chunks onto the wall and the mixing paddle travelling along the same co-incident circular path, scrapes it off the wall.

This could be used for a single shaft or multiple shaft mixer where the blades of the mixers are mounted on some arm that sweeps over the surface of the mixer. More generally it could be used in any mixer where a paddle is mounted to a fixture that connects that paddle to a drive mechanism, that is where the drive mechanism forces the paddle to move over the surface such as in a pan mixer, or planetary mixer or ribbon mixer.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
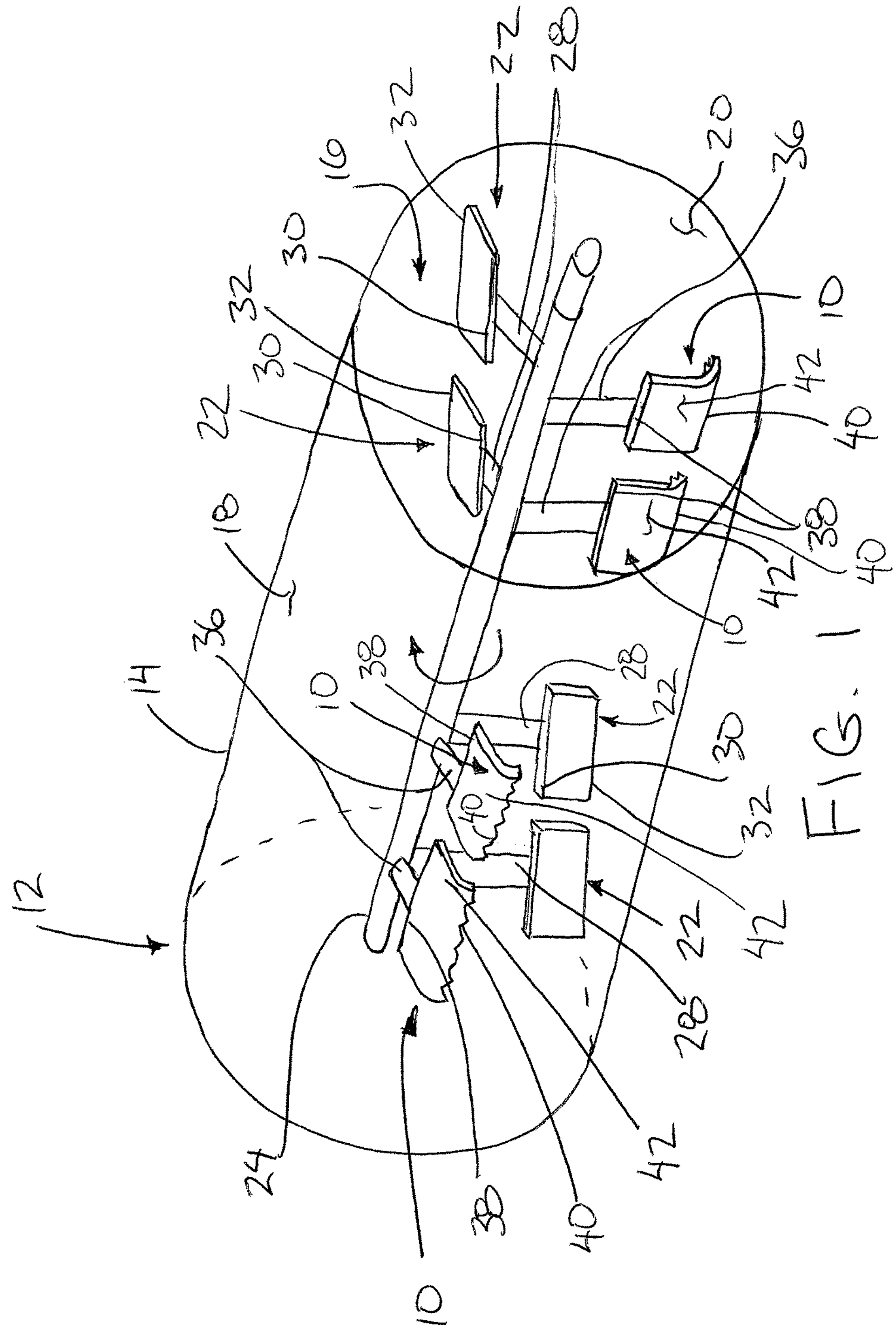
FIG. 1 is a perspective view of a mixer including primary mixing blades and lump conditioning blades supported therein.

Referring to the accompanying figures, there is illustrated a lump conditioning mixer blade generally indicated by reference numeral 10. The blade 10 is particularly suited for use with a mixer 12 of the type generally used for mixing and conditioning fine particulate material mixtures or pastes therein, for example the uniform distribution of moisture throughout a fine particle paste such as tailings, and the break-up of lumps or reduction of lump size to form an uniform and conditioned paste.

The mixer 12 may take various forms as illustrated in the accompanying figures, however the invention will primarily be described with regard to the embodiment of FIGS. 1 through 4. The mixer in this instance comprises a vessel 14 having boundary walls which surround and define a mixing chamber 16 therein which receives the material to be mixed. The boundary walls as illustrated include a cylindrical wall portion 18 and a pair of end wall portions 20 at axially opposed ends of the cylindrical wall portion for enclosing the mixing chamber therein.

A plurality of primary mixing blades 22 are supported on the shaft 24 of a driving mechanism to drive the mixing blades in a mixing motion relative to the boundary walls of the chamber to effectively mix the material within the mixer. The driving mechanism further includes a motor 26 supported externally of the vessel 14 which serves to drive rotation of the shaft 24 relative to the vessel which remains fixed relative to the ground. The shaft 24 is coaxial with the cylindrical wall portion 18 to permit the mixing blades 22 to be mounted on respective radially extending arms 28 fixed onto the shaft. The primary mixing blades 26 are thus supported by the driving mechanism for movement in a generally circumferential direction in a sweeping or scraping action adjacent the inner surface of the boundary wall as the shaft 24 is rotated.

Figure 2:
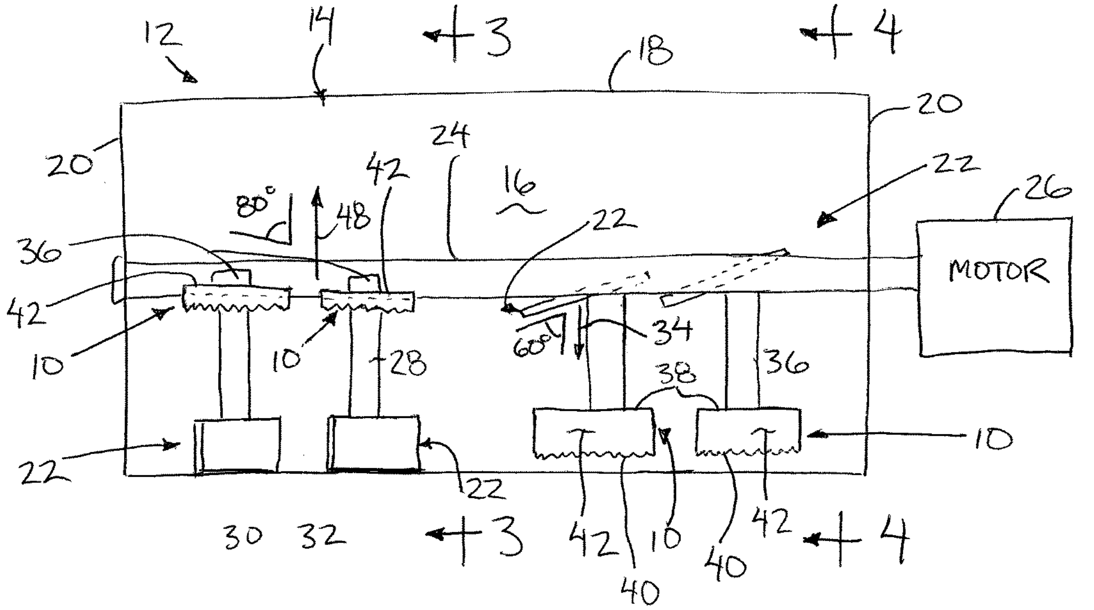
FIG. 2 is a side elevational view of the mixer according to FIG. 1.
Figure 3:
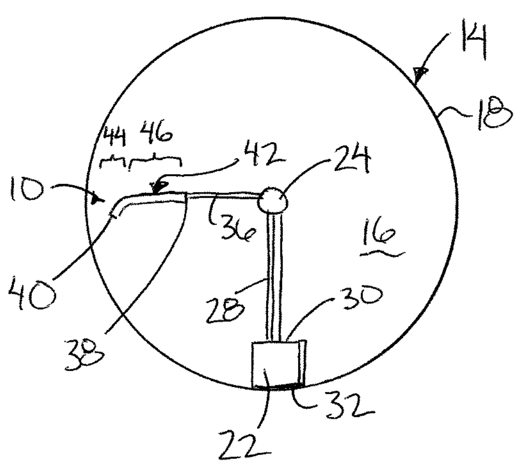
FIG. 3 is a section view along the line 3-3 of FIG. 2.
Figure 4:
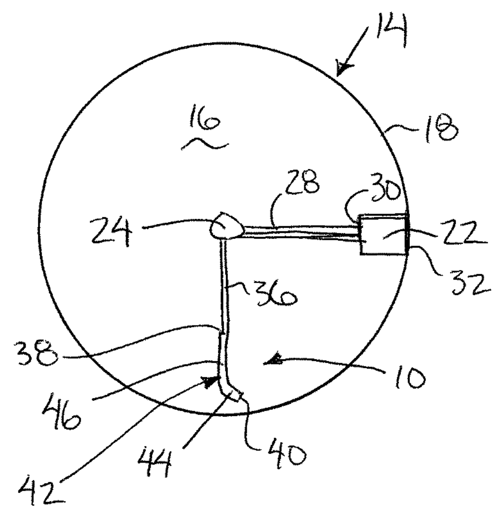
FIG. 4 is a section view along the line 4-4 of FIG. 2.

Each primary mixing blade 22 comprises a blade body having broad leading and trailing sides and a narrow thickness between the leading and trailing sides so as to be generally sheet-like. The leading side spans radially outward from an inner edge 30 to an opposing working outer edge 32 in close proximity to the boundary wall. The leading face of the blade body which spans between the inner and outer edges lies generally perpendicularly to the boundary wall so as to be perpendicular to a tangential plane relative to the cylindrical wall portion and the circumferential direction of motion of the blades about the axis of the shaft. The leading face is also oriented so as to be inclined relative to a normal plane which is perpendicular to the vector of motion 34. More particularly, as shown in FIG. 2, the leading face is inclined at an angle of approximately 60 degrees relative to the vector of motion 34 while remaining in a plane which is perpendicular to the boundary wall.

The mixer 12 in the illustrated embodiment is particularly distinguished from the prior art by the addition of additional mixing blades presented as the lump conditioning blades 10. Each lump condition blade also includes a blade body formed to have broad leading and trailing sides and a narrow thickness between the leading and trailing sides so as to be generally sheet-like. The blade body is mounted on one or more radially extending arms 36 extending radially outward from the shaft 24. Each blade body spans radially from an inner edge 38 nearest to the axis of the shaft to an opposing outer edge 40 which is farthest from the shaft and nearest to the boundary wall of the vessel. The leading face 42 of the blade body of the lump conditioning blade 10 faces forwardly into the direction of motion which is oriented in a circumferential direction together with the movement of the primary mixing blades 22. The leading face includes an outer end portion 44 adjacent the outer edge 40 and a main portion 46 spanning radially from the inner edge 38 to the outer end portion 44.

The main portion 46 of the leading face is oriented perpendicularly to the boundary wall so as to be similarly perpendicular to a plane which is tangential to the circumferential direction of motion and the cylindrical wall portion. The main portion of the leading face is also oriented to be near perpendicular to the motion vector 48 dictating the direction of motion. More particularly, the main portion of the normal vector of the leading face is preferably oriented to be between 20 degrees and parallel with the forward motion vector 48. In the illustrated embodiment, the main portion 46 is oriented at approximately 80 degrees to the motion vector 48.

The outer end portion 44 of the lump conditioning blade is oriented in a trailing relationship relative to the main portion. Accordingly, the outer working edge 40 is offset rearwardly in the direction of motion 48 relative to the main portion 46. In the illustrated embodiment, the outer edge portion is curved so as to be generally convex at the leading face from the main portion 46 to the working outer edge 40. In an alternative embodiment however, the outer end portion may also have a flat planar shape which is simply angularly offset relative to the flat plane of the main portion 46 by a bend therebetween which is substantially parallel to the outer edge.

The working outer edge 40 is preferably a non-linear serrated edge such that the outermost portion of the lump conditioning blade is discontinuous and interrupted therealong in the axial direction of the vessel 14.

The rigid blade body of the lump conditioning blade is fixed on rigid radial arms 36 such that the working outer edge 40 is disposed in a spaced apart relationship relative to the inner surface of the boundary wall. The drive mechanism supports the lump conditioning blade such that the outer edge thereof is maintained at a fixed prescribed space from the boundary wall throughout the mixing motion as the lump conditioning blade is displaced along the boundary wall in the direction of the forward motion vector 48.

The size of the gap defining the prescribed space between the outer edge 40 and the inner surface of the boundary wall may be adjustable prior to use by adjusting the mounting of the lump conditioning blade relative to the support arms 36, however, the positioning of the lump conditioning blade relative to the shaft remains fixed in operation. Typically, the gap size is selected so as to be larger than the maximum diameter of any aggregate particles expected within the material being mixed to avoid any crushing of aggregate particles within the mixture. The gap remains sufficiently small however that the gap is smaller than the expected size of lumps within the mixture to force the lumps through the gap as the blades are rotated with the shaft relative to the boundary wall to effectively reduce the size of the lumps.

Each lump conditioning blade is typically mounted on the shaft of the drive mechanism in association with one or more primary mixing blades 22 in which the mixing blades are supporting in a trailing relationship relative to the lump conditioning blades. Accordingly, any area of the boundary wall over which the lump conditioning blades pass is arranged to have a subsequent primary mixing blade pass over the same area. In this arrangement, the lump conditioning blades effectively smear lumps against the boundary wall to reduce the overall diameter of the lumps and to increase the surface area of dry material within the lumps, followed by primary mixing blades which sweep and scrape the surface of the boundary wall clear of the smeared mixture thereon.

Figure 5:
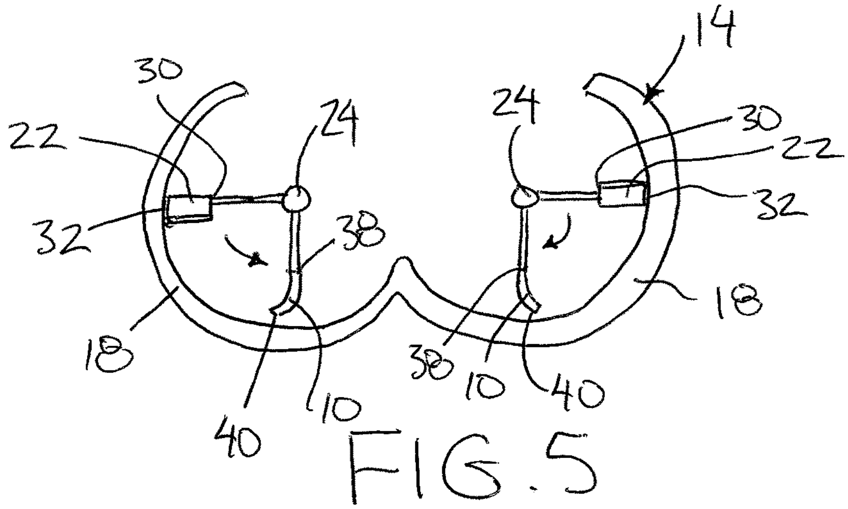
FIG. 5 is a schematic representation of an alternative embodiment of the lump conditioning blades applied to a twin shaft mixer.

Turning now to FIG. 5, according to further embodiment of the invention, a twin shaft mixer is shown in which the vessel comprises a pair of generally cylindrical wall portions 28, each coaxially locating a respective shaft 24 therein upon which primary mixing blades 22 and lump conditioning blades 10 are supported.

Figure 6:
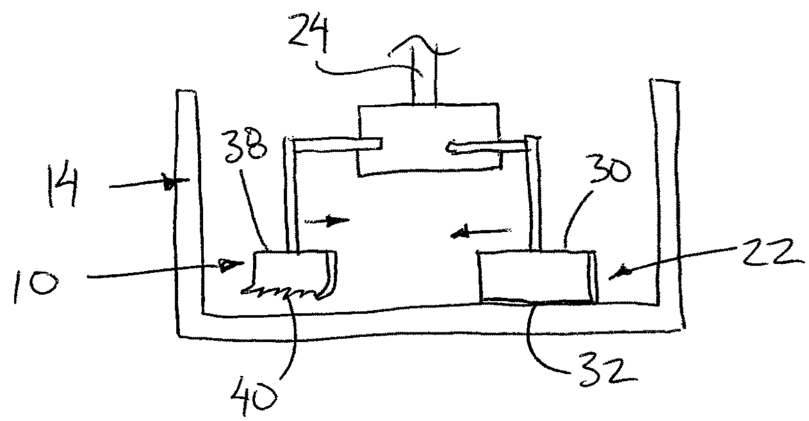
FIG. 6 is a schematic representation of yet another embodiment of the lump conditioning blades applied to a pan mixer.

Turning now to FIG. 6, according to another embodiment of the invention, a pan mixer is shown in which the vessel includes a flat bottom boundary wall. The drive mechanism supports primary mixing blades 22 and lump conditioning blades 10 for movement along the flat bottom boundary wall so that the outer working edges of the lump conditioning blades are maintained at a smearing gap and the primary mixing blades scrape and/or sweep the boundary wall as described above.

Since various modifications can be made in the invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A mixer for mixing a mixture containing lumps of prescribed diameter therein, the mixer comprising:

- a vessel defining a mixing chamber therein surrounded by boundary walls for receiving the mixture containing the lumps therein;
- a plurality of mixing blades; and
- a driving mechanism supporting the mixing blades in the mixing chamber for mixing motion relative to the vessel so as to mix the mixture within the mixing chamber of the vessel;
- the mixing blades including:
  - at least one lump conditioning blade having a rigid body terminating at a working edge along an outer side of the rigid body and which is supported by the driving mechanism so as to be movable in a working direction of rotation along a respective one of the boundary walls;
  - said at least one lump conditioning blade having a main portion occupying a majority of a leading face of the lump conditioning blade that is oriented transversely to said one of the boundary walls;
  - the working edge of said at least one lump conditioning blade being oriented substantially parallel to the respective boundary wall and at an angle relative to the working direction of rotation between 60 and 90 degrees;
  - the working edge of said at least one lump conditioning blade being supported at a prescribed space from the boundary wall which is smaller than the prescribed diameter of the lumps so as to be effective to smear the lumps in the mixture against said one of the boundary walls and to reduce a lump size of the lumps in the mixture as the mixture passes between the working edge of the lump conditioning blade and the boundary wall;
  - at least one primary blade having a rigid blade body terminating at a working edge along an outer side of the rigid body and which is supported by the driving mechanism so as to be movable in said working direction of rotation along said one of the boundary walls along the same path as said at least one lump conditioning blade in a trailing relationship relative to said at least one lump conditioning blade;
  - the working edge of said at least one primary blade being directly adjacent to said one of the boundary walls so as to (i) be in closer proximity to said one of the boundary walls than the working edge of said at least one lump conditioning blade and (ii) be arranged to scrape the mixture from said one of the boundary walls that was smeared against said one of the boundary walls by said at least one lump conditioning blade.

2. The mixer according to claim 1 wherein the boundary walls of the vessel include a general cylindrical portion and wherein the driving mechanism comprises at least one horizontal shaft supporting the mixing blades thereon for rotation about a horizontal mixing axis.

3. The mixer according to claim 1 wherein the boundary walls of the vessel include a pair of generally cylindrical portions and wherein the driving mechanism comprises a pair of horizontal shafts associated with the pair of cylindrical portions respectively upon which the mixing blades are supported for rotation relative to the boundary walls.

4. The mixer according to claim 1 wherein the working edge of said at least one lump conditioning blade is discontinuous along a length thereof.

5. The mixer according to claim 1 wherein the working edge of said at least one lump conditioning blade is serrated.

6. The mixer according to claim 1 wherein the working edge of said at least one primary blade is disposed at an angle relative to the working direction of rotation thereof which is less than an angle of the working edge relative to the working direction of rotation of said at least one lump conditioning blade.

7. The mixer according to claim 1 wherein a leading face of the blade body of said at least one primary blade is disposed at an angle relative to the working direction of rotation thereof which is less than an angle of the main portion of the leading face of the rigid body of said at least one lump conditioning blade.

8. The mixer according to claim 1 wherein the working edge of said at least one lump conditioning blade is oriented near perpendicular to the working direction of rotation.

9. The mixer according to claim 1 wherein the leading face of the rigid body of said at least one lump conditioning blade includes an outer end portion locating the working edge thereon which is disposed radially outwardly relative to the main portion and which is sloped relative to a plane of the main portion, the working edge being supported spaced rearwardly in a trailing relationship in the working direction of rotation relative to the plane of the main portion of the leading face of the rigid body.

10. The mixer according to claim 9 wherein the main portion of the rigid body of said at least one lump conditioning blade is substantially perpendicular to the respective boundary wall.

11. The mixer according to claim 9 wherein the main portion of the rigid body of said at least one lump conditioning blade is near perpendicular to the working direction of rotation.

12. A mixer in combination with a mixture, the mixer comprising:

- a vessel defining a mixing chamber therein surrounded by boundary walls;
- the mixture being received within the vessel, the mixture containing aggregate having a prescribed maximum diameter and lumps having a prescribed diameter that is greater than the prescribed maximum diameter therein;
- a plurality of mixing blades; and
- a driving mechanism supporting the mixing blades in the mixing chamber for mixing motion relative to the vessel so as to mix the mixture within the mixing chamber of the vessel;
- the mixing blades including:
  - at least one lump conditioning blade having a rigid body terminating at a working edge along an outer side of the rigid body and which is supported by the driving mechanism so as to be movable in a working direction of rotation along a respective one of the boundary walls;

said at least one lump conditioning blade having a main portion occupying a majority of a leading face of the lump conditioning blade that is oriented substantially perpendicular to said one of the boundary walls;

the working edge of said at least one lump conditioning blade being oriented substantially parallel to the respective boundary wall and at an angle relative to the working direction of rotation between 60 and 90 degrees;

the working edge of said at least one lump conditioning blade being supported at a prescribed space from the boundary wall which is greater than the prescribed maximum diameter of the aggregate and smaller than the prescribed lump diameter of the lumps so as to be effective to smear the lumps in the mixture against said one of the boundary walls and to reduce a lump size of the lumps in the mixture as the mixture passes between the working edge of the lump conditioning blade and the boundary wall;

at least one primary blade having a rigid blade body terminating at a working edge along an outer side of the rigid body and which is supported by the driving mechanism so as to be movable in said working direction of rotation along said one of the boundary walls along the same path as said at least one lump conditioning blade in a trailing relationship relative to said at least one lump conditioning blade;

the working edge of said at least one primary blade being directly adjacent to said one of the boundary walls so as to (i) be in closer proximity to said one of the boundary walls than the working edge of said at least one lump conditioning blade and (ii) be arranged to scrape the mixture from said one of the boundary walls that was smeared against said one of the boundary walls by said at least one lump conditioning blade.

* * * * *